(12) United States Patent
Boyington (10) Patent No.: US 8,290,826 B2
(45) Date of Patent: Oct. 16, 2012

(54) METHOD, MEDIUM, AND SYSTEM FOR OPERATING A GENDER NEUTRAL GIFT REGISTRY

(76) Inventor: Kelly Boyington, Dallas, TX (US)

( * ) Notice: Subject to any disclaimer, the term of this patent is extended or adjusted under 35 U.S.C. 154(b) by 351 days.

(21) Appl. No.: 12/783,670

(22) Filed: May 20, 2010

(65) Prior Publication Data

US 2011/0288961 A1    Nov. 24, 2011

(51) Int. Cl.
*G06Q 30/00* (2012.01)
(52) U.S. Cl. .................................. 705/26.63
(58) Field of Classification Search ............... 705/26.1, 705/27.1, 26.63, 26.7
See application file for complete search history.

(56) References Cited

U.S. PATENT DOCUMENTS

| | | | | |
|---|---|---|---|---|
| 6,167,383 A * | 12/2000 | Henson | ........................ | 705/26.5 |
| 6,609,106 B1 * | 8/2003 | Robertson | ......................... | 705/5 |
| 6,865,546 B1 * | 3/2005 | Song | ............................ | 705/7.18 |
| 6,999,941 B1 * | 2/2006 | Agarwal | ...................... | 705/26.2 |
| 7,013,292 B1 * | 3/2006 | Hsu et al. | ......................... | 705/37 |
| 8,195,529 B1 * | 6/2012 | Cohen et al. | .................. | 705/27.1 |
| 2005/0091120 A1 * | 4/2005 | Auletta | ........................... | 705/26 |
| 2008/0243630 A1 * | 10/2008 | Farney | ............................ | 705/26 |
| 2010/0100220 A1 * | 4/2010 | Belanger et al. | .............. | 700/104 |

OTHER PUBLICATIONS

Dec. 2, 2009—http://web.archive.org/web/20090212102445/http://www.wishpot.com.*

* cited by examiner

*Primary Examiner* — Matthew Zimmerman
(74) *Attorney, Agent, or Firm* — Stewart & Liu PLLC

(57) ABSTRACT

The illustrative embodiments described herein provide a computer implemented method, apparatus, and computer program product for delivering a selected gender specific baby registry gift. A baby registry profile is created in response to receiving registration information from a registrant. The baby registry profile is populated with a set of baby registry gifts selected by the registrant. The set of baby registry gifts includes one or more pairs of gender specific baby registry gifts. In response to receiving a gender notification from a gender notification entity, a selected gender specific baby registry gift is identified from the one or more pairs of gender specific baby registry gifts. The selected gender specific registry gift is delivered for the registrant.

20 Claims, 6 Drawing Sheets

FIG. 7

METHOD, MEDIUM, AND SYSTEM FOR OPERATING A GENDER NEUTRAL GIFT REGISTRY

BACKGROUND OF THE INVENTION

1. Field of the Invention

The present invention relates generally to gift registries. Still more particularly, the present invention relates to gender neutral, web-based gift registries.

2. Description of the Related Art

A gift registry is a service that allows a registrant to create a unique, personalized gift registry profile that includes gift preferences selected from an inventory of items. A friend or family member can then access the gift registry profile to assist in the selection of a gift. Two common types of gift registries are bridal registries and baby registries.

Currently existing baby registries offer registrants the option of registering for gender specific baby registry gifts or gender neutral baby registry gifts. A gender specific baby registry gift is a gift item that includes aesthetic design elements commonly associated with either a boy or a girl, and which typically indicates the gender of the item's user. For example, a gender specific pair of pants for a girl may be pink and have ruffles. Similarly, a gender specific pair of pants for a boy may be blue and be adorned with images of robots. In contrast, gender neutral baby registry gifts are items that are not readily identifiable with either a boy or a girl. Gender neutral baby registry gifts typically include gender neutral design elements not commonly associated with either a boy or a girl. For example, gender neutral clothing typically is neither pink nor blue, but rather green or yellow.

SUMMARY OF THE INVENTION

The illustrative embodiments described herein provide a computer implemented method, apparatus, and computer program product for selecting a gender specific baby registry gift. A baby registry profile is created in response to receiving registration information from a registrant. The baby registry profile is populated with a set of baby registry gifts selected by the registrant. The set of baby registry gifts includes one or more pairs of gender specific baby registry gifts. In response to receiving a gender notification from a gender notification entity, a selected gender specific baby registry gift is identified from the one or more pairs of gender specific baby registry gifts. The selected gender specific registry gift is delivered for the registrant.

DETAILED DESCRIPTION OF THE PREFERRED EMBODIMENT

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1:
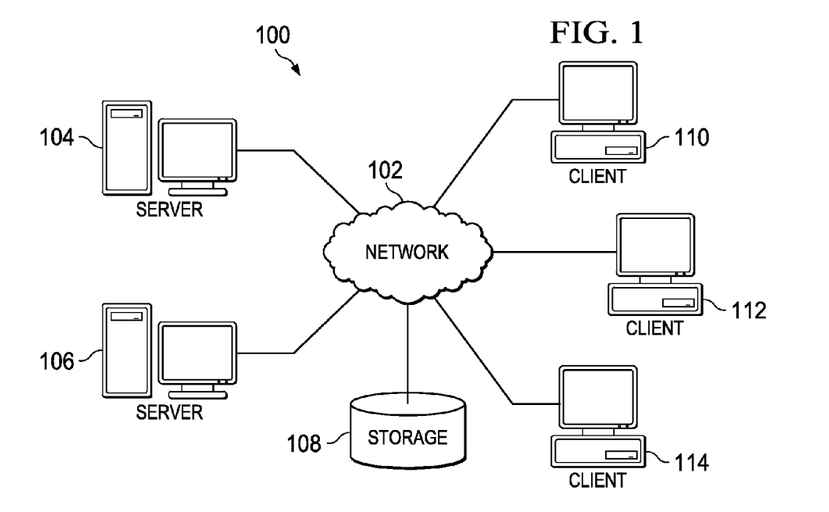
FIG. 1 is a pictorial representation of a network of data processing systems in which illustrative embodiments may be implemented.
Figure 2:
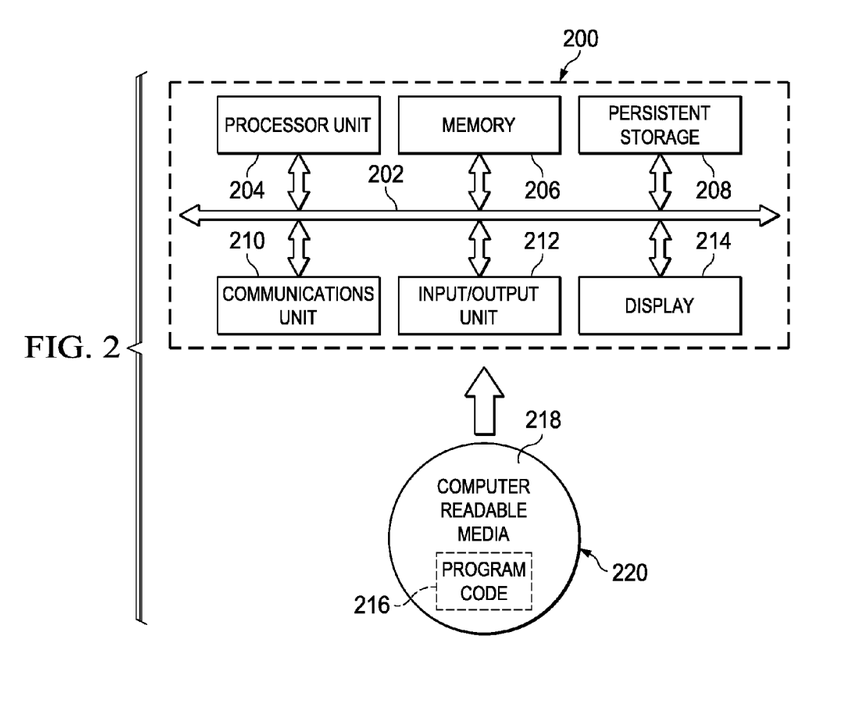
FIG. 2 is a block diagram of a data processing system in which illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In an illustrative example, a delayed gender identification registry is hosted on a server, such as server 104. The delayed gender identification registry is a baby registry that allows a registrant to create a baby registry profile populated with gender specific baby registry gifts without having to know the gender of registrant's baby. The baby registry profile may be saved in a storage device such as storage 108 in FIG. 1. Registrants, purchasers, or other authorized members of the public may access the baby registry profile by accessing the delayed gender identification registry on a client computer, such as client 110.

Program code located in network data processing system 100 may be stored on a computer recordable storage medium and downloaded to a data processing system or other device for use. For example, program code may be stored on a computer recordable storage medium on server 104 and downloaded to client 110 over network 102 for use on client 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference now to FIG. 2, a block diagram of a data processing system is shown in which illustrative embodiments may be implemented. Data processing system 200 is an example of a computer, such as server 104 or client 110 in FIG. 1, in which computer usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer usable program code, or computer readable program code that may be read and executed by a processor in processor unit 204. The program code in the different embodiments may be embodied on different physical or tangible computer readable media, such as memory 206 or persistent storage 208.

Program code 216 is located in a functional form on computer readable media 218 that is selectively removable and may be loaded onto or transferred to data processing system 200 for execution by processor unit 204. Program code 216 and computer readable media 218 form computer program product 220 in these examples. In one example, computer readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 218 also may take the form of a persistent storage, such as a hard drive, a thumb drive, or a flash memory that is connected to data processing system 200. The tangible form of computer readable media 218 is also referred to as computer recordable storage media. In some instances, computer recordable media 218 may not be removable.

Alternatively, program code 216 may be transferred to data processing system 200 from computer readable media 218 through a communications link to communications unit 210 and/or through a connection to input/output unit 212. The communications link and/or the connection may be physical or wireless in the illustrative examples. The computer readable media also may take the form of non-tangible media, such as communications links or wireless transmissions containing the program code.

In some illustrative embodiments, program code 216 may be downloaded over a network to persistent storage 208 from another device or data processing system for use within data processing system 200. For instance, program code stored in a computer readable storage medium in a server data processing system may be downloaded over a network from the server to data processing system 200. The data processing system providing program code 216 may be a server computer, a client computer, or some other device capable of storing and transmitting program code 216.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown.

As one example, a storage device in data processing system 200 is any hardware apparatus that may store data. Memory 206, persistent storage 208, and computer readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Users of online baby registries include registrants and purchasers. In many instances, registrants are expectant parents. The registrant utilizes an online baby registry to create a baby registry profile. A baby registry profile is a unique user profile that includes, as an example and without limitation, a list of baby registry gifts selected by the registrant. Purchasers, who are typically friends or relatives of the registrant, browse the list of baby registry gifts and purchase one or more gifts for the registrant.

Users of currently existing baby registries who wish to receive gender specific baby registry gifts are typically required to know and specify the gender of their baby at the time baby registry gifts are selected. The embodiments disclosed herein recognize that one dilemma faced by prospective parents who utilize traditional baby registries relates to the inherent conflict of delaying discovery of their unborn baby's gender and the desire to receive gender specific baby registry gifts. Registrants using traditional baby registries who elect to delay discovery of their unborn baby's gender are relegated to receiving gender neutral baby registry gifts. Those registrants who prefer to receive gender specific baby registry gifts sacrifice the surprise of finding out their baby's gender on the day of birth. Therefore, the illustrative embodiments recognize that what is needed is a system and method for enabling registrants to receive gender specific registry gifts without also requiring the registrants to know their unborn baby's gender at the time baby registry gift selections are made.

The delayed gender identification registry provided by the illustrative embodiments allow expectant parents to create a baby registry profile for receiving gender specific registry gifts without having to specify their baby's gender at the time baby registry gifts are selected. In one illustrative embodiment, when a registrant is creating a baby registry profile on the delayed gender identification registry, the registrant may select one or more pairs of gender specific baby registry gifts. Gifts in a pair of gender specific baby registry gifts are substantially similar in functionality and purpose, but differ in aesthetics. In particular, one item in the pair is designed for a male gendered infant or child and the other item in the pair is designed for a female gendered infant or child. Thus, the registrant is able to identify and select desirable gifts that are substantially similar, without having to specify whether the gift is for a baby boy or a baby girl.

In an illustrative example, an expectant mother wanting to register for a swaddling blanket may select a first blanket designed for a baby boy, which is blue and decorated with images of robots. The expectant mother may also select a second blanket designed for a baby girl, which is pink and decorated with images of butterflies. The expectant mother's selection of the first blanket and the second blanket forms a pair of gender specific baby registry gifts. Whether the first blanket or the second blanket is eventually delivered is determined by the gender of the baby when the gender is confirmed. In another example, the expectant mother may be presented with one or more pairs of gender specific baby registry gifts from which the expectant mother may choose.

After gift selections have been made and stored in the gift registry profile, purchasers who access the registrant's gift registry profile may then purchase one or more gifts for the benefit of the registrant. Once the baby's gender has been confirmed, either before or after birth, a selected gender specific gift is identified from each pair of gender specific baby registry gifts according to the baby's gender. The baby's gender may be determined by any currently existing or later developed means. For example, and without limitation, gender may be determined by ultrasound, amniocentesis testing, DNA testing, or visual inspection upon birth. The selected baby registry gift is then delivered.

Accordingly, one embodiment provides for a computer implemented method, apparatus, and computer program product for delivering a selected gender specific baby registry gift. A baby registry profile is created in response to receiving registration information from a registrant. The baby registry profile is populated with a set of baby registry gifts selected by the registrant. The set of baby registry gifts includes one or more pairs of gender specific baby registry gifts. A pair of gender specific baby registry gifts comprises a female gender version of a gift item and a male gender version of the same or substantially similar gift item. In response to receiving a gender notification from a gender notification entity, a selected gender specific baby registry gift is identified from the one or more pairs of gender specific baby registry gifts. The selected gender specific registry gift is delivered for the registrant.

Figure 3:
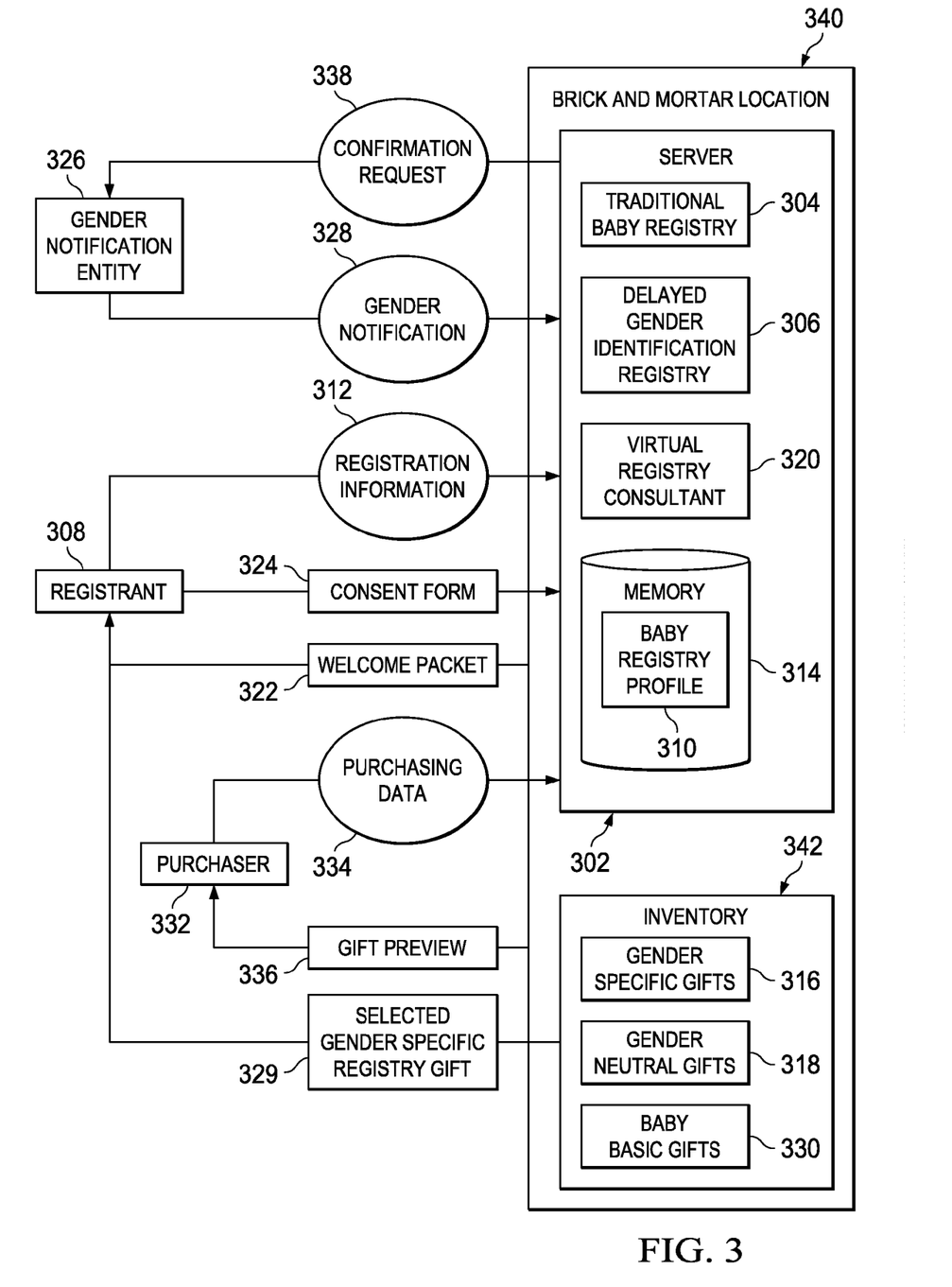
FIG. 3 is a block diagram of system for selecting gender specific baby registry gifts in accordance with an illustrative embodiment.

FIG. 3 is a block diagram of a system configured for selecting gender specific baby registry gifts in accordance with an illustrative embodiment. The system depicted in FIG. 3 includes components of a network data processing system, such as network data processing system 100 in FIG. 1. For example, the system includes server 302, which may be implemented as a server such as, for example but without limitation, server 104 in FIG. 1. In addition, system 300 optionally includes one or more client computers, such as clients 110 and 112 in FIG. 1, which enable users to interface with online registries hosted on server 302. Furthermore, communications between components of system 300 may flow through a network, such as network 102 in FIG. 1.

In this illustrative example in FIG. 3, server 302 hosts a set of baby registries. As used herein, the term "set of" refers to one or more, unless specifically defined otherwise. Thus, the set of baby registries is one or more baby registries. In this example, server 302 hosts two baby registries—traditional baby registry 304 and delayed gender identification registry 306. Traditional baby registry 304 is an example of a currently existing baby registry configured only to allow delivery of gender specific baby registry gifts by specifying, at the time the gifts are selected, the gender of the baby for whom the gifts are purchased. Additionally, traditional baby registry 304 only allows expectant parents without any information of their baby's gender to select gender neutral registry gifts.

Delayed gender identification registry 306 is a baby registry configured to enable registrants to select and receive gender specific baby registry gifts without prior knowledge of the gender of registrant's baby. As used herein, the term "baby" may refer to an unborn baby, a newborn baby, a baby between 0-24 months of age, a toddler, or any minor child. The term unborn baby may refer to an unborn baby, embryo, or fetus at any stage of development during the first trimester of pregnancy, the second trimester of pregnancy, or the third trimester of pregnancy. A baby registry profile is created and populated with gift selections. After the baby's gender has been determined, selected baby registry gifts may be identified, based on the baby's gender, and then delivered.

Types of baby registry gifts available from online registries may include gender specific gifts 316 and gender neutral gifts 318. Gender specific gifts 316 are baby registry gifts designed for either a baby girl or baby boy. In particular, gender specific gifts 316 include design elements for either a baby boy or a baby girl so that the gender of the baby may be easily insinuated simply by the association of the gift and a baby or child using or gift or benefiting from the use of the gift. Gender specific gifts 316 may include clothing with a gender specific design or color palette. For example, a gender specific pair of pants for girls may include frills and have a pink color. A gender specific pair of pants for boys may simply be colored blue and lack feminine design elements, such as frills, which are more appropriate for girls. In contrast, gender neutral gifts 318 are baby registry gifts designed for boys or girls such that the gender of a child associated with the gender neutral gift is not readily identifiable. Gender neutral gifts 318 may include clothing or toys that have a gender neutral design or color palette. For example, a gender neutral pair of pants may be green and devoid of accessories or designs that may be more appropriate for either girls or boys.

Registrant 308 is one or more users of an online baby registry. In particular, registrant 308 utilizes a baby registry, such as delayed gender identification registry 306, for creating baby registry profile 310. Baby registry profile 310 is a unique user profile associated with registrant 308. The data included in baby registry profile 310 is provided, in part, by registrant 308 in registration information 312. Registration information 312 is data that may include, for example and without limitation, an account name and password, user preferences, a shipping address, an unborn baby's projected due date, and an election to delay discovery of their baby's gender but still receive gender specific baby registry gifts. An example of baby registry profile 310 and the data contained therein is discussed in more detail in FIG. 4.

Although traditional baby registry 304 and delayed gender identification registry 306 are depicted as separate baby registries in this example, in an alternate embodiment, delayed gender identification registry 306 and traditional baby registry 304 may be hosted together in a single, combined baby registry. This integrated baby registry would allow registrant 308 to create baby registry profile 310 using either the capabilities of traditional baby registry 304 or delayed gender identification registry 306. For example, registrant 308 may navigate to the integrated baby registry and fill out a brief questionnaire. The result of the questionnaire may indicate that registrant 308 would like to delay the discovery of their baby's gender until birth, but that registrant 308 would still like to receive gender specific gifts. In this scenario, registrant 308 may be presented with the interface to the unique features and functionality provided by delayed gender identification registry 306. Alternatively, if the result of the questionnaire indicates that registrant 308 already knows the gender of their unborn baby, then registrant 308 may be presented with the interface to the functionality offered by traditional baby registry 304.

Baby registry profile 310 is stored in memory 314. Memory 314 is a data storage device for storing data. Memory 314 may include, for example and without limitation, a hard disk, a random access memory (RAM), a read-only memory (ROM), an erasable programmable read-only memory (EPROM or Flash memory), an optical fiber, a portable compact disc read-only memory (CD-ROM), an optical storage device, and a magnetic storage device. In another embodiment, baby registry profile 310 may be stored separate from server 302 and on a network accessible storage device such as storage 108 in FIG. 1.

In this illustrative example in FIG. 3, registrant 308 is an expectant mother who elects to delay discovery of her baby's gender until birth, but who also desires to receive gender specific baby gifts 316. Registrant 308 navigates to delayed gender identification registry 306 to generate baby registry profile 310. Registrant 308 may access delayed gender identification registry 306 by any currently existing or later developed means. In a non-limiting example, delayed gender identification registry 306 is presented a user, such as registrant 308, through a web based browser. The browser may be presented on a computer, laptop, smart phone, or any other currently existing or later developed computing device. For example, registrant 308 may arrive at delayed gender identification registry 306 by clicking on a hyperlink in an email or instant message, or on a link provided on another website, such as traditional baby registry 304. Registrant 308 may also navigate to delayed gender identification registry 306 by entering a website address into an address bar of a browser, or click on a result provided from an online search engine for relevant search terms. Upon accessing delayed gender identification registry 306, registrant 308 provides registration information 312. Registrant 308 may provide registration information 312 in response to prompts from virtual registry consultant 320.

Virtual registry consultant 320 is a software component for managing delayed gender identification registry 306. For example, virtual registry consultant 320 may direct registrant 308 through the process of creating baby registry profile 310 and populating baby registry profile 310 with one or more baby registry gifts. In addition, virtual registry consultant 320 may also send out notifications, execute program code, and track deadlines. In one example, virtual registry consultant 320 may take the form of an interactive icon or avatar that prompts the user to provide information or make a selection. In other examples, the virtual registration consultant may take the form of a series of image-based or text-based prompts for evoking action by a user.

In this example in FIG. 3, virtual registry consultant 320 is shown as a standalone component hosted on server 302. However, in an alternate embodiment, virtual registry consultant 320 may be included in at least one of traditional baby registry 304 or delayed gender identification registry 306. As used herein, the term "at least one of", when used with a list of items means that different combinations of one or more of the items may be used and only one of each item in the list may be needed. For example, "at least one of item A, item B, and item C" may include, for example, without limitation, item A or item A and item B. This example also may include item A, item B, and item C or item B and item C. Thus, with respect to FIG. 3, virtual registry consultant 320 may be included in either traditional baby registry 304 or delayed gender identification registry 306, or both.

Virtual registry consultant 320 optionally uses registration information 312 to prepare and deliver welcome packet 322 to registrant 308. Welcome packet 322 is a set of documents relating to the services and operation of delayed gender identification registry 306. For example, welcome packet 322 may include brochures, advertising material, medical release forms, consent forms, and/or other legal documents and disclaimers. Welcome packet 322 may be implemented as one or more paper documents, electronic documents, or a combination of paper documents and electronic documents. In one example, virtual registry consultant 320 delivers welcome packet 322 to registrant 308 using contact information provided in registration information 312.

Consent form 324 is one or more authorization forms, such as medical release forms, which authorizes the release of medical information of registrant 308. Information included in consent form 324 may also identify gender notification entity 326 associated with registrant 308. Gender notification entity 326 is an entity responsible for notifying virtual registry consultant 320 of the gender of a baby born to or otherwise associated with registrant 308. Gender notification entity 326 may be, for example and without limitation, registrant 308 confirming the gender of the baby after birth, a spouse or other relative of registrant 308, a doctor, a nurse, a midwife or other medical personnel, a medical care facility, technician or other employee of a medical care facility responsible for performing gender identification tests, such as amniocentesis testing or ultrasound testing.

Gender notification entity 326 transmits to virtual registry consultant 320 gender notification 328. Gender notification 328 is a message indicating the gender of the baby born to registrant 308. Gender notification 328 may be generated either before or after birth of the baby, once the baby's gender has been confirmed. Gender notification 328 may be any type of message or form of communication. For example, gender notification 328 may be a telephone call, a letter, an email, instant message, or an entry logged directly into baby registry profile 310 by a doctor or nurse via a web based browser.

After registrant 308 provides registration information 312, virtual registry consultant 320 may guide registrant 308 through a gift selection process to populate baby registry profile 310 with a set of baby registry gifts. In one embodiment, the gift selection process is bifurcated. In a first step, virtual registry consultant 320 presents registrant 308 with baby basic gifts 330 for selection. Baby basic gifts 330 are registry gifts that are manufactured without gender specific or gender neutral design elements as differentiating features. Baby basic gifts 330 may include, for example and without limitation, baby monitors, baby wipes, baby formula, baby powder, thermometers, or other similar types of items. Registrant 308 may browse baby basic gifts 330 and select one or more gifts for inclusion in baby registry profile 310. After updating and saving the selections to baby registry profile 310, virtual registry consultant 320 presents registrant 308 with a second step in an exemplary gift selection process.

Virtual registry consultant 320 presents to registrant 308 gender specific gifts 316 for selection. In an illustrative embodiment, virtual registry consultant 320 presents gender specific gifts 316 to registrant 308 in pairs. Each pair is formed from substantially similar items that differ mainly in aesthetic design elements. In particular, one item in the pair is designed for a girl and the other item in the pair is designed for a boy. For example, gender specific gifts 316 may include a blanket. When presented to registrant 308 for selection, a pair of substantially similar blankets is presented. The gender specific blankets may differ in one or more aspects of the design and aesthetic features, such as, without limitation, color, texture, fabric, print, design, scent, shape, accessories, picture elements, or any other design and aesthetic features. In this example, but without limitation, the blankets differ in color and picture elements—one blanket is blue and the other blanket is pink.

Registrant 308 may then select the pair of gender specific blankets for inclusion in baby registry profile 310 without having to select specifically either the pink blanket or the blue blanket. Subsequently, after the gender of the baby of registrant 308 has been determined, the appropriately colored blanket may be selected and delivered to registrant 308. For example, if the baby's gender is later determined to be male, the blue blanket is selected and delivered. In this manner, registrant 308 receives gender specific baby registry gifts without specifying the unborn baby's gender at the time baby registry gifts are selected.

In another embodiment, particularly with regard to a gift selection process relating to gender specific gifts 316, virtual registry consultant 320 may receive, from registrant 308, a selection of a female gender version of a gift item and a male gender version of the same or substantially similar gift item to form a pair of gender specific baby registry gifts which is then saved to baby registry profile 310.

After registrant 308 has finished selecting gifts for baby registry profile 310, purchaser 332 may access baby registry profile 310 to browse and purchase gifts for registrant 308. Purchaser 332 is one or more users who access baby registry profile 310 for buying gifts for registrant 308. In browsing baby registry profile 310 for gifts to purchase, purchaser 332 may elect to sort the list of baby registry gifts based on any sort criteria, such as a price point or type of gift. After deciding on baby registry gifts to purchase from the list provided in baby registry profile 310, purchaser 332 generates and sends purchasing data 334 to virtual registry consultant 320.

Purchasing data 334 is data identifying the one or more gifts from baby registry profile 310 for purchase. In addition, purchasing data 334 may include payment information, such as a credit card number and billing information, for purchasing the one or more registry items. Purchasing data 334 may also specify contact information for purchaser 332. The contact information may include a telephone number, email address, or mailing address if different than the provided billing information.

In on embodiment, virtual registry consultant 320 sends gift preview 336 to purchaser 332 using the contact information specified in purchasing data 334. Gift preview 336 is an acknowledgment that identifies the baby registry gift or gifts bought by purchaser 332. For example, if purchaser 332 bought a gender specific baby registry gift for registrant 308, then gift preview 336 may be a card printed on paper stock illustrating the pair of gender specific baby registry gifts. One side of gift preview 336 would include an illustration of the gender specific baby registry gift as it would be delivered for a baby boy. The other side of gift preview 336 would include an illustration of the baby registry gift as it would be delivered for a baby girl. In this manner, purchaser 332 attending a baby shower hosted for the benefit of registrant 308 would be able to present gift preview 336 to registrant 308. In addition, gift preview 336 would indicate which gift was purchased, but would not divulge to registrant 308 the gender of the unborn baby if the gender has been already been determined.

Upon receiving gender notification 328 from gender notification entity 326, virtual registry consultant 320 identifies selected gender specific registry gift 329 for delivery to registrant 308. Selected gender specific registry gift 329 is one or more gender specific baby registry gifts, identified from each pair of gender specific baby registry gifts purchased from the list of gifts in baby registry profile 310. For example, if gender notification 328 indicates that the baby born to registrant 308 is a girl, then virtual registry consultant 320 selects from each pair of gender specific gifts in baby registry profile 310 all the gender specific gifts for baby girls.

Selected gender specific registry gift 329 is delivered for registrant 308. In one embodiment, selected baby registry gift 329 is delivered to registrant 308. In an alternate embodiment, registrant 308 may be notified that selected baby registry gift 329 is available for pickup at a predetermined location, such as at a shipping facility or store.

If virtual registry consultant 320 has not received gender notification 328 by a predefined period of time, virtual registry consultant 320 delivers to gender notification entity 326 confirmation request 338. Confirmation request 338 is a message prompting gender notification entity 326 to provide gender notification 328. The predetermined period of time may be the expiration of a date or event. The predetermined period of time may be a user defined date or event, as well as a default time. For example, if the projected due date has passed and virtual registry consultant 320 has not received gender notification 328, then virtual registry consultant 320 may request gender notification 328 in the event that the baby has been born, or confirm with gender notification entity 326 that the baby has not been delivered.

In an illustrative embodiment in FIG. 3, resources for operating delayed gender identification registry 306 are maintained at brick and mortar location 340. Brick and mortar location 340 is one or more facilities that may include, for example and without limitation, a central headquarters and other satellite offices to provide employees with a working environment. In addition, brick and mortar location 340 may include warehouses strategically located throughout the country for storing inventory 342. Inventory 342 is a set of gifts that are available to registrant 308 for selection. In alternate embodiments, server 302 may be located remotely from brick and mortar location 340.

In the embodiment described in FIG. 3, system 300 is implemented in an online data processing system. However, in another embodiment, system 300 may be implemented in whole or in part on an offline data processing system that is not connected to a network. For example, system 300 may be implemented on a kiosk at brick and mortar location 340. In this example, system 300 input, such as gender notification 328, through any type of input device associated with the kiosk. An input device may be, without limitation, a keyboard, a touch screen, a voice recognition system, a mouse, a controller, or any other type of input device.

Figure 4:
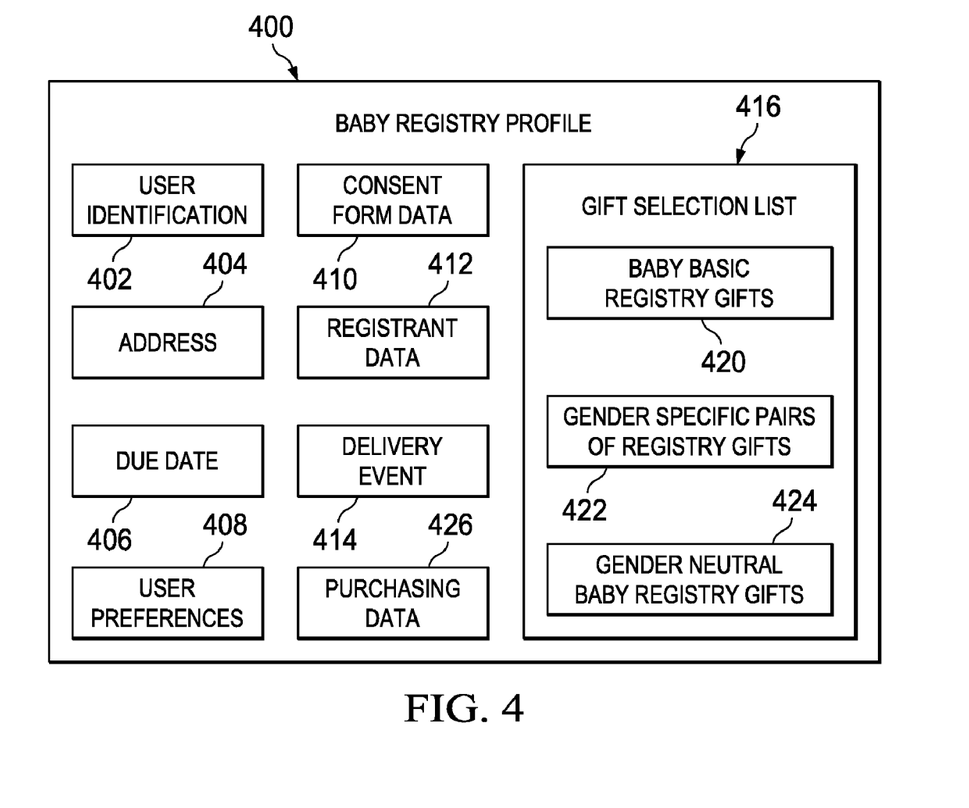
FIG. 4 is block diagram of a baby registry profile in accordance with an illustrative embodiment.

FIG. 4 is a block diagram of a baby registry profile in accordance with an illustrative embodiment. Baby registry profile 400 is a baby registry profile such as, for example, baby registry profile 310 in FIG. 3. Data included in baby registry profile 400 may originate, in part, from information provided in registration information, such as registration information 312 in FIG. 3.

User ID 402 is a unique identifier for differentiating baby registry profiles and for associating a unique registrant with baby registry profile 400. User ID 402 may be automatically assigned to each unique registry profile by a virtual registry consultant, or may be selected by each registrant during the registration process. User ID 402 may be formed from any combination of alphanumeric characters.

Address 404 is data identifying the mailing address for a registrant associated with baby registry profile 400. Baby registry gifts selected by the registrant and bought by one or more purchasers are shipped to the location specified in address 404. In on embodiment, baby registry gifts are shipped out by a virtual registry consultant at a predefined time that is determined using by due date 406. Due date 406 is data identifying a projected birth day of a baby, an adoption day, date for receiving an adoption referral, or any other date on which the gender of a born or unborn baby is expected to be received. The virtual registry consultant may send the baby registry gifts at or around the date specified by due date 406.

Alternatively, a predetermined algorithm may be used to calculated a date for delivering baby registry gifts based on due date 406.

User preferences 408 are settings selected by a registrant associated with registry profile 400. User preferences 408 may specify preferences such as, for example, the manner and type of notifications presented to the registrant. User preferences 408 may include information specifying an email address or telephone number for receiving emails or text messages, respectively. The emails or text messages may be used for delivering reminders, such as a reminder to a registrant to provide signed consent forms if such forms have not yet been returned. User preferences 408 may also specify that a registrant elects to delay discovery of their unborn baby's gender until birth, and that the registrant intends to register for gender specific baby registry gifts. Thus, a virtual registry consultant may reference user preferences 408 to determine which types of gifts to present a registrant during the gift selection process.

Consent form data 410 is data derived from or related to the consent forms provided to a registrant in a welcome packet, such as welcome packet 322 in FIG. 3. Consent form data 410 may include information such as, for example, contact information for a gender notification entity selected by the registrant for confirming the gender of the registrant's baby. In addition, consent form data 410 may include an updateable field indicating whether the registrant has returned the requisite consent forms, including any medical release forms that would be necessary to enable the gender confirmation entity to provide a gender notification to the virtual registry consultant. Absence of data indicating that the consent forms have been returned may trigger a virtual registry consultant to send out one or more reminders or other forms of notifications to a registrant provide signed consent forms.

Registrant data 412 is data relating to the registrant who provided the registration information for generating baby registry profile 400. Registrant data 412 may include information such as, for example and without limitation, the number of children born to the registrant, a marital status of registrant 412, an income level, or other types of demographic information. A virtual registry consultant may use registrant data 412 for performing tasks, such as, for example, maintaining an inventory of baby registry gifts, and/or sending out specifically chosen incentives.

Delivery event 414 is an event that causes a virtual registry consultant to initiate delivery of gifts purchased on behalf of a registrant who created baby registry profile 400. Delivery event 414 may be an occurrence or event, the expiration of a predefined amount of time, or the achievement of any other specified milestone. For example, in an illustrative embodiment delivery event 414 is the receipt of a gender notification, such as gender notification 328 in FIG. 3. In another embodiment, delivery event 414 is the expiration of a period of time determined from due date 406. Thus, in this embodiment, delivery event 414 may be the week preceding the date specified in due date 406. Delivery of gifts a week before the date specified in due date 406 would permit enough time for shipping to allow the gifts to arrive to a location specified in address 404 by the time the baby is brought home.

In alternate embodiments, delivery event 414 may cause a virtual registry consultant to notify the recipient of the baby registry gifts that the gifts are available for pickup at a location, such as brick and mortar location 340 in FIG. 3. In other non-limiting examples, the pickup location may be a post office, a shipping facility, or any other facility capable of receiving and/or storing baby registry gifts.

Gift selection list 416 is a list of baby registry gifts selected by the registrant from an inventory of items, such as inventory 342 in FIG. 3. Gift selection list 416 may include baby basic registry gifts 420, pairs of gender specific baby registry gifts 422, and/or gender neutral baby registry gifts 424. Baby basic registry gifts 420 are gifts selected by a registrant from a collection of baby basic gifts, such as baby basic gifts 330 in FIG. 3. Likewise, gender neutral baby registry gifts 424 are gifts selected by a registrant from a collection of gender neutral gifts such as gender neutral gifts 318 in FIG. 3. Pairs of gender specific baby registry gifts 422 is one or more pairs of gender specific baby registry gifts selected by a registrant from a collection of gender specific gifts such as gender specific gifts 316 in FIG. 3. Each pair of gender specific baby registry gifts from pairs of gender specific baby registry gifts 422 includes a male gender specific version of a baby registry gift and a female gender specific version of the baby registry gift. In other words, each pair of gender specific baby registry gifts includes a gift as it would be presented to a baby boy, and the equivalent gift that would be presented to a baby girl. Gifts are presented in pairs because the gender of the baby is unknown at the time the gifts are selected. After the gender of registrant's baby is confirmed, then a virtual registry consultant identifies selected baby registry gift from each pair of gender specific gifts for delivery.

Gift selection list 416 may be periodically updated to indicate which gifts have already been purchased and by whom. In an illustrative embodiment, a virtual registry consultant may determine which gifts from gift selection list 416 have been purchased by referring to purchasing data 426. Purchasing data 426 is purchasing data such as purchasing data 334 in FIG. 3. Purchasing data 426 specifies a purchaser and the gift that was purchased. Thus, the virtual registry consultant may cross reference the gifts identified in purchasing data 426 as having been purchased with the gifts listed in gift selection list 416 to show which gifts have already been purchased.

Figure 5:
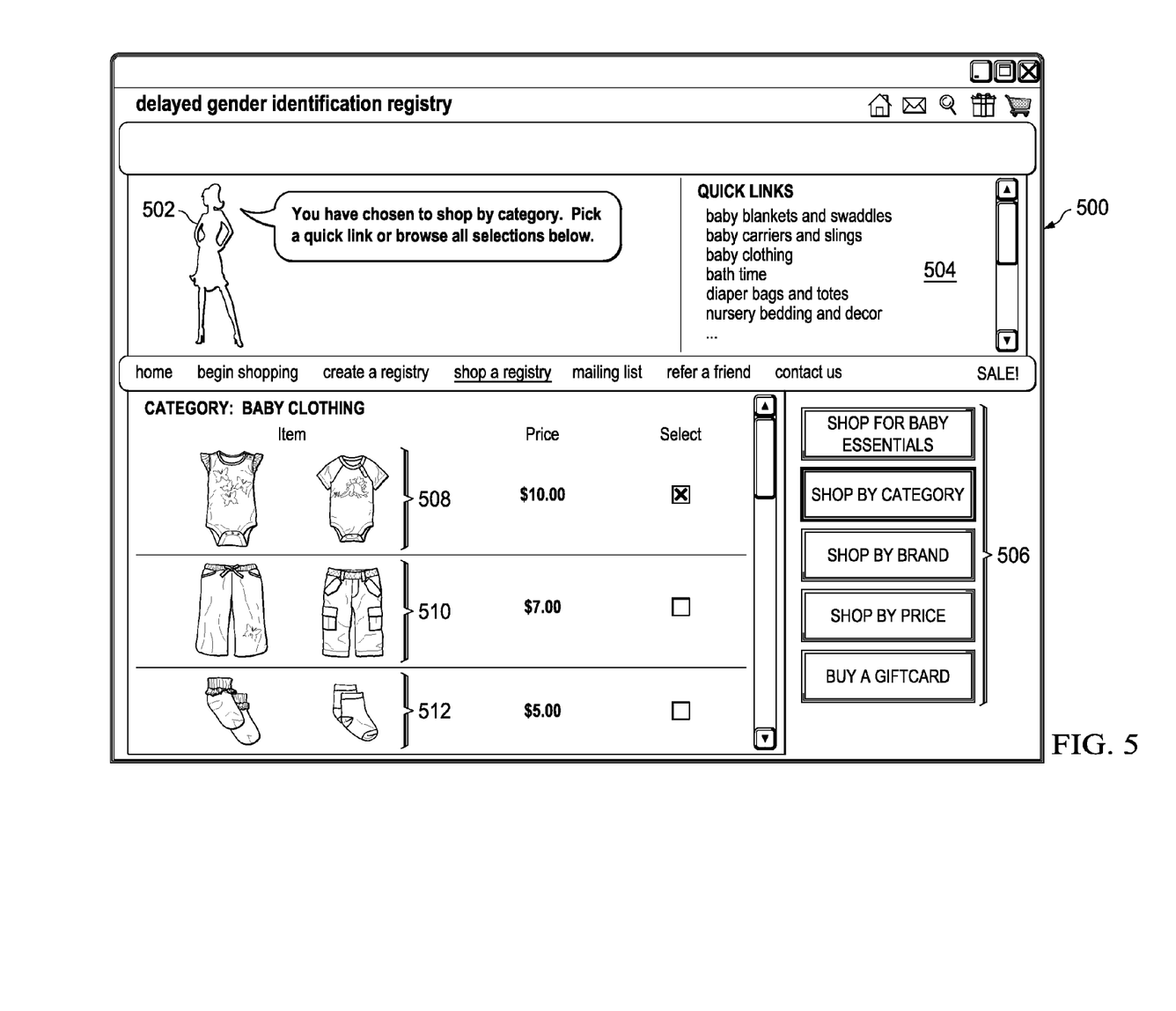
FIG. 5 is a screenshot depicting a delayed gender identification registry in accordance with an illustrative embodiment.

FIG. 5 is a screenshot depicting a delayed gender identification registry in accordance with an illustrative embodiment. Delayed gender identification registry 500 is a delayed gender identification registry such as delayed gender identification registry 306 in FIG. 3. In this illustrative example in FIG. 5, a purchaser interfaces with delayed gender identification registry 500 for creating, updating, and/or accessing a baby registry profile, such as, without limitation, baby registry profile 310 in FIG. 3. The baby registry profile includes a list of baby registry gifts for purchase.

The purchaser is assisted in a purchasing process by virtual registry consultant 502. Virtual registry consultant 502 is a virtual registry consultant such as virtual registry consultant 320 in FIG. 3. In this illustrative embodiment in FIG. 5, virtual registry consultant 502 is depicted as an avatar providing text-based prompts for guiding the purchaser through the purchasing process. Virtual registry consultant 502 performs a variety of tasks for managing the selection and delivery of baby registry gifts. The tasks include, but are not limited to, providing instructions, receiving purchaser selections, and updating the corresponding baby registry profile with the purchasing data provided by the purchaser.

In this example, the purchaser navigated to the "baby clothing" category from quick link menu 504. Categories of baby registry gifts included in quick link menu 504 may include, but are not limited to baby accessories, baby blankets and swaddles, baby carriers and slings, baby clothing, bath time, diaper bags and totes, just for daddy, just for mommy, nursing, and toys. Purchasers may browse all the baby registry gifts in the baby registry profile, or the purchasers may select a category of baby registry gifts. In addition, one or more sorts may be applied to the baby registry gifts by selecting a sorting option from sort menu 506.

The baby registry gifts presented to the purchaser in delayed gender identification registry 500 are presented in pairs of gender specific baby registry gifts 508, 510, and 512. A pair of gender specific baby registry gifts, such as pair of gender specific baby registry gifts 508, is a set of substantially similar baby registry gifts that differs in aesthetic and/or design elements. One item in a gender specific pair is designed for a baby girl and the other item in the gender specific pair is designed for a baby boy. Thus, a registrant may populate a baby registry profile with pairs of gender specific baby registry gifts 508, 510, and 512 without having to specifically select the gift items for a baby boy or baby girl. In the same manner, a purchaser may select one or more pairs of gender specific baby registry gifts to purchase for the registrant with or without knowledge of the unborn baby's gender. One selected gender specific baby registry gift is selected from each pair of gender specific baby registry gifts by virtual registry consultant 502 upon receipt of a gender notification from a gender notification entity.

Each item in a pair of gender specific baby registry gifts, such as pair of gender specific baby registry gift 508 may be individually selected by a registrant to form pair of gender specific baby registry gift 508. Alternatively, a virtual registry consultant may form pairs of gender specific baby registry gifts, such as pairs of gender specific baby registry gifts 508, 510, and 512 based upon popular gift selections by other registrants. In addition, the virtual registry consultant may select gifts from an inventory to form a pair of gender specific baby registry gifts based upon a registrant's specified user preferences or prior gift selections.

Figure 6:
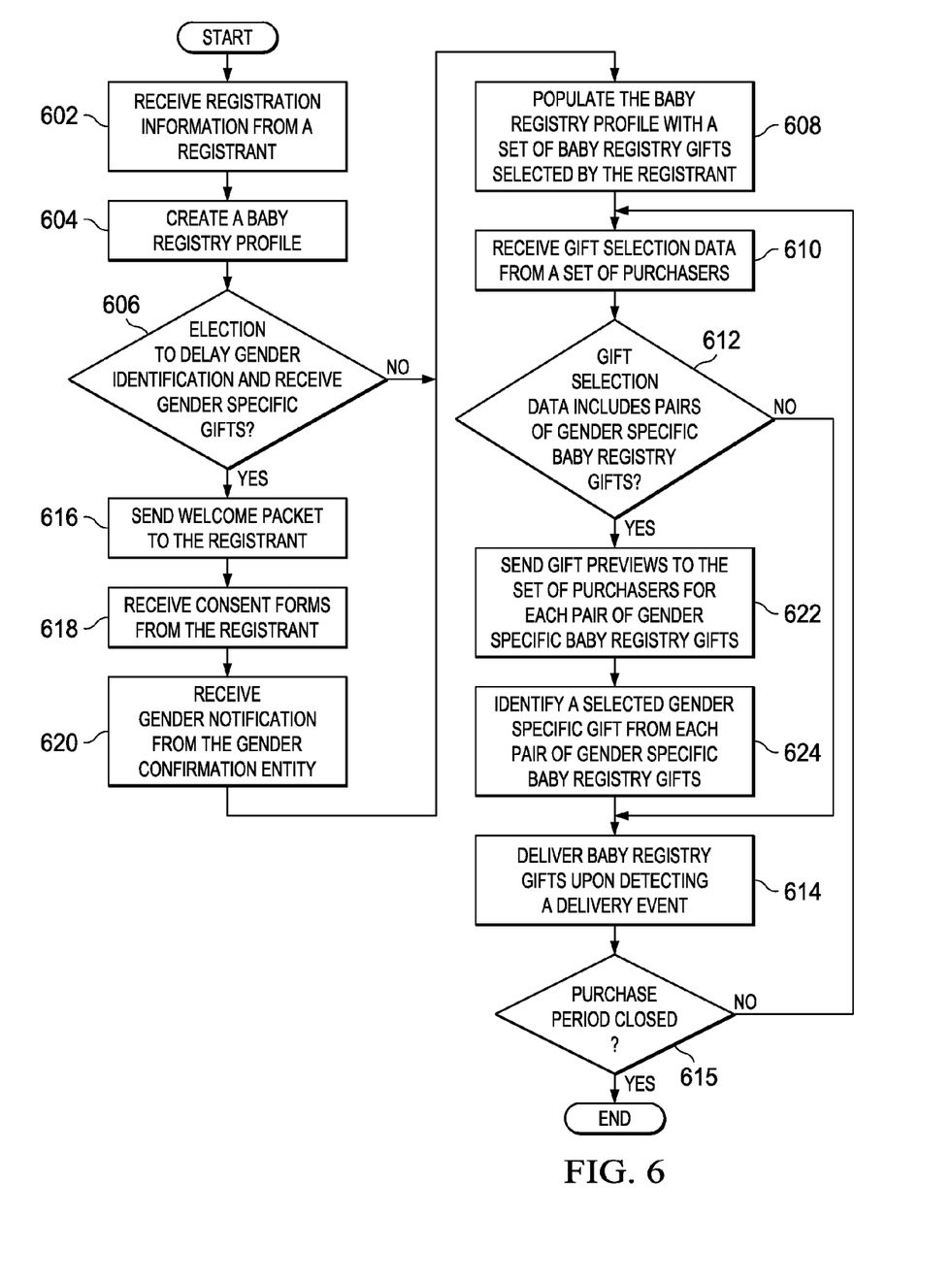
FIG. 6 is a flowchart of a process for selecting gender specific baby registry gifts in accordance with an illustrative embodiment.

FIG. 6 is a flowchart of a process for selecting gender specific baby registry gifts in accordance with an illustrative embodiment. The process depicted in FIG. 4 may be performed by a software component such as virtual registry consultant 320 in FIG. 3.

The process begins by receiving registration information from a registrant (step 602). The registration information is information associated with a registrant, such as, but without limitation, registration information 312 in FIG. 3. A baby registry profile is created (step 604). The baby registry profile is a baby registry profile such as baby registry profile 310 in FIG. 3.

A determination is made as to whether an election was made to delay gender identification and receive gender specific gifts (step 606). If the determination is made that an election to delay gender identification and receive gender specific gifts was not made, then the process populates the baby registry profile with a set of baby registry gifts selected by the registrant (step 608).

After the baby registry profile is populated with one or more gifts selected by a registrant, gift selection data is received from a set of purchasers (step 610). A determination is then made to determine whether the gift selection data includes pairs of gender specific baby registry gifts (step 612). If the gift selection data does not include pairs of gender specific pairs baby registry gifts, then the baby registry gifts purchased by the set of purchasers in step 610 is delivered upon detecting a delivery event (step 614). The delivery event is a delivery event such as delivery event 414 in FIG. 4.

A determination is then made as to whether the purchasing period is closed (step 615). The purchasing period is a period of time that may be specified by a registrant, an administrator, programmer, or a default set of rules in which purchasers may continue to purchase gifts in a baby registry profile. The purchase period may extend up until the day of birth or to some set date before or after birth. If the purchase period is not closed, then the process returns to step 610. If the purchase period is closed, then the process terminates.

Returning to step 606, if the determination is made that an election was made to delay gender identification and receive gender specific gifts, then a welcome packet is sent to the registrant (step 616). Consent forms are received from the registrant (step 618). If consent forms are not received from the registrant by a predefined period of time, then a reminder may be sent to a registrant to return the requisite consent forms (step not shown). After consent forms are received from a registrant in step 618, a gender notification is received from a gender confirmation entity (step 620), and the process continues to step 608.

At step 612, if a determination is made that the gift selection data includes pairs of gender specific baby registry gifts, then gift previews are sent to the set of purchasers for each pair of gender specific baby registry gifts (step 622).

A selected gender specific gift from each pair of gender specific baby registry gifts is identified (step 624). The selected gender specific gift is identified using the gender notification received in step 620. The process then continues to step 614.

Figure 7:
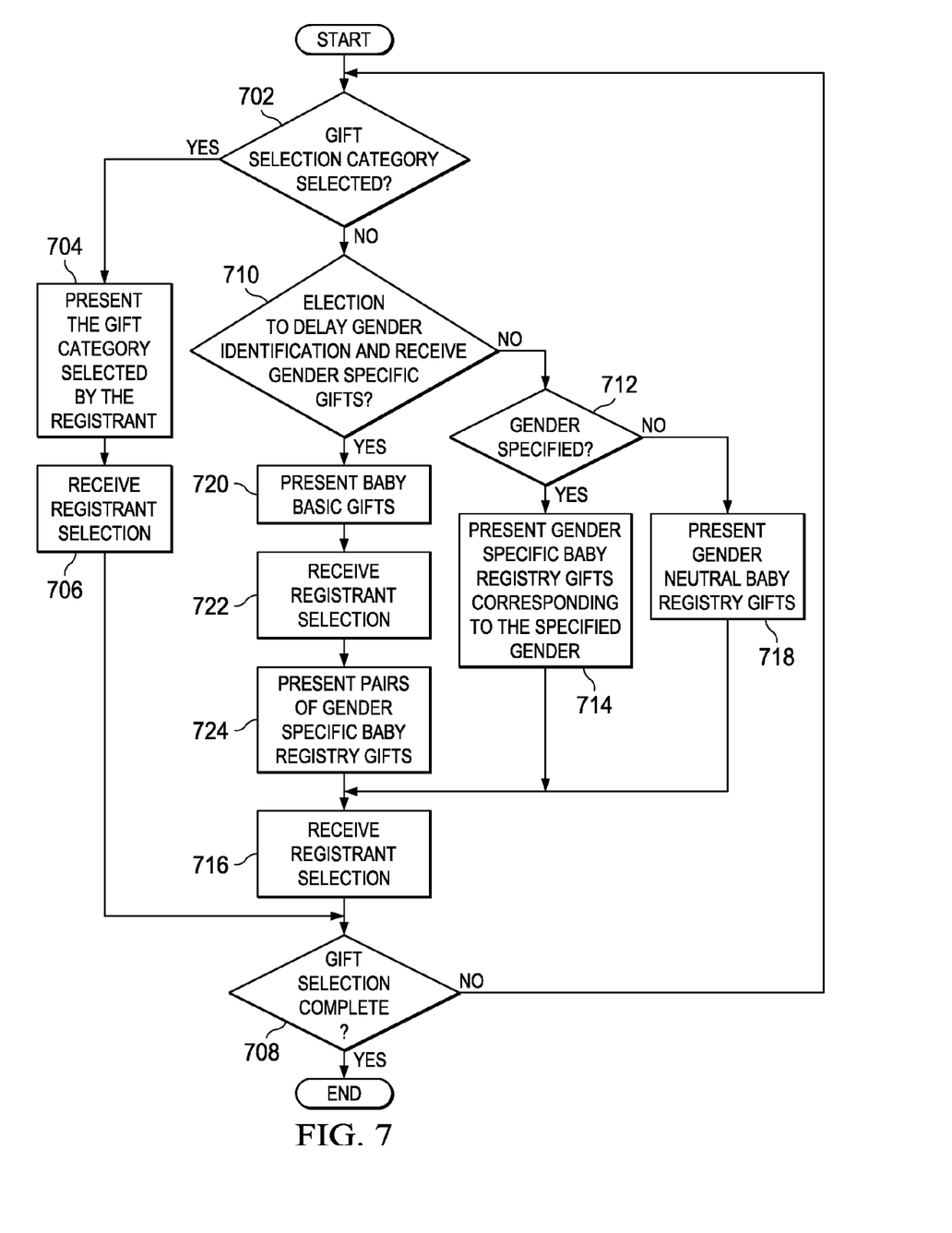
FIG. 7 is a flowchart of a process for populating a baby registry profile with a set of baby registry gifts in accordance with an illustrative embodiment.

FIG. 7 is a flowchart of a process for populating a baby registry profile with a set of baby registry gifts in accordance with an illustrative embodiment. The process depicted in FIG. 7 can be implemented by a software component such as virtual registry consultant such as virtual registry consultant 320 in FIG. 3.

A determination is made as to whether a gift selection category is selected (step 702). If a gift selection category is selected, then the process presents the gift category selected by the registrant (step 704). The registrant's selection is received (step 706) and a determination is made as to whether the gift selection process is complete (step 708). If the gift selection process is complete, then the process terminates. However, if the gift selection process is not complete, then the process returns to step 702.

If at step 702 the determination is made that a gift selection category was not selected, then the process makes a determination as to whether an election was made to delay gender identification and receive gender specific baby registry gifts (step 710). If there was no election to delay gender identification and receive gender specific baby registry gifts, then a determination is made as to whether a gender was specified (step 712). If a gender was specified, then gender specific baby registry gifts are presented which correspond with the specified gender (step 714). The registrant's selection is received (step 716) and the process continues to step 708.

If at step 712, the determination is made that a gender was not specified, then the gender neutral baby registry gifts are presented to the registrant (step 718) and the process continues to step 716.

Returning to step 710, if the election is made to delay gender identification and receive gender specific baby registry gifts, then the gift selection process proceeds according the delayed gender identification baby registry gift selection process. In an illustrative example, baby basic gifts are presented to the registrant (step 720) and the registrant's selection is received (step 722). Pairs of gender specific baby registry gifts are presented (step 724) and the registrant's selection is received (step 716) before continuing to step 708.

In accordance with the foregoing, the illustrative embodiments described herein provide a computer implemented method, apparatus, and computer program product for delivering a selected gender specific baby registry gift. A baby registry profile is created in response to receiving registration information from a registrant. The baby registry profile is populated with a set of baby registry gifts selected by the registrant. The set of baby registry gifts includes one or more pairs of gender specific baby registry gifts. In response to receiving a gender notification from a gender notification entity, a selected gender specific baby registry gift is identified from the one or more pairs of gender specific baby registry gifts. The selected gender specific registry gift is delivered for the registrant.

Users of traditional baby registries must make the decision to either delay discovery their baby's gender and receive gender neutral baby registry gifts, or determine the gender of their baby to enable receipt of gender specific baby registry gifts. Many prospective parents prefer to outfit their children in gender specific clothing and accessories, but must sacrifice the surprise and anticipation of delaying discovery of their baby's gender. However, users of the delayed gender identification registry do not have to make such a sacrifice because gift selection may be performed despite not knowing the gender of their unborn baby. Gender specific baby registry gifts are presented to a registrant and then selected in gender specific pairs. Once the registrant's baby's gender has been determined, either before or after birth, a selected gender specific baby registry gift may be identified from each gender specific pair. In this manner, users of delayed gender identification registries may delay discovery of their unborn baby's gender until the day of birth yet still receive gender specific baby registry gifts.

Furthermore, the implementation of gift previews enables users to maintain the common tradition of throwing baby showers for the benefit of the expectant parents and their unborn baby. In particular, gift previews are sent to purchasers who have bought gender specific baby registry gifts. The gift previews may be delivered to a registrant at a baby shower so that attendees of the baby shower will not show up empty handed. Additionally, gift previews are designed so as not to divulge the gender of the unborn baby, if the gender has already been determined.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/ or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories, which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method comprising:
creating a baby registry profile for a registrant of a baby registry;
responsive to determining that the registrant has not specified a gender of a baby associated with the baby registry profile, using at least a computer processor to populate the baby registry profile with at least one pair of gender specific baby registry gifts designated by the registrant, wherein the at least one pair of gender specific baby registry gifts comprises a first product and a second product, wherein the first product is designated for a female baby and the second product is designated for a male baby;
receiving a purchase selection from a set of purchasers of at least one of the at least one pair of gender specific baby registry gifts designated by the registrant;
responsive to receiving a gender notification specifying the gender of the baby, automatically identifying for delivery from the purchase selection only products in the at least one of the at least one pair of gender specific baby registry gifts which correspond to the specified gender of the baby.

2. The computer implemented method of claim 1, wherein populating the baby registry profile further comprises:
presenting the registrant with a set of baby registry gifts in a gift selection process, wherein a first step of the gift selection process comprises selection of baby basic registry gifts, and wherein a second step of the gift selection process comprises selection of the at least one pair of gender specific baby registry gifts.

3. The computer implemented method of claim 1, wherein populating the baby registry profile further comprises:
presenting a male gender specific version of a gender specific baby registry gift with a female gender specific version of the gender specific baby registry gift to form the at least one pair of gender specific baby registry gifts.

4. The computer implemented method of claim 1, wherein populating the baby registry profile further comprises:
receiving a selection of a male gender specific version of a gender specific baby registry gift and a female gender specific version of the gender specific baby registry gift to form the at least one pair of gender specific baby registry gifts.

5. The computer implemented method of claim 1, further comprising:
responsive to receiving the purchase selection, sending a gift preview to the set of purchasers, wherein the gift preview depicts a male gender specific version of a gift in the at least one of the at least one pair of gender specific baby registry gifts, and wherein the gift preview depicts a female gender specific version of the gift in the at least one of the at least one pair of gender specific baby registry gifts.

6. The computer implemented method of claim 1, further comprising:
sending a welcome packet to the registrant, wherein the welcome packet comprises a consent form; and
receiving the consent form from the registrant with a signature of the registrant for authorizing a gender notification entity to provide the gender notification.

7. The computer implemented method of claim 1, further comprising:
responsive to an absence of the gender notification within a predetermined period of time, delivering a confirmation request to a gender notification entity.

8. A tangible computer readable medium comprising executable instructions which when executed by a computer processor cause the computer processor to perform the a series of steps, the instructions comprising:
first program instructions for creating a baby registry profile for a registrant of a baby registry;
second program instructions for populating, in response to determining that the registrant has not specified a gender of a baby associated with the baby registry profile, the baby registry profile with at least one pair of gender specific baby registry gifts designated by the registrant, wherein the at least one pair of gender specific baby registry gifts comprises a first product and a second product, wherein the first product is designated for a female baby and the second product is designated for a male baby;
third program instructions for receiving a purchase selection from a set of purchasers of at least one of the at least one pair of gender specific baby registry gifts designated by the registrant; and
fourth program instructions for, in response receiving a gender notification specifying the gender of the baby, automatically identifying for delivery from the purchase selection only products in the at least one of the at least one pair of gender specific baby registry gifts which correspond to the specified gender of the baby.

9. The tangible computer readable medium of claim 8, wherein the third program instructions further comprises:
fifth program instructions for presenting the registrant with set of baby registry gifts in a gift selection process, wherein a first step of the gift selection process comprises selection of baby basic registry gifts, and wherein a second step of the gift selection process comprises selection of gender specific baby registry gifts; and
wherein the fifth program instructions are stored on the tangible computer readable medium.

10. The tangible computer readable medium of claim 8, wherein the third program instructions further comprise sixth program instructions for presenting a male gender specific version of a gender specific baby registry gift with a female gender specific version of the gender specific baby registry gift to form the at least one pair of gender specific baby registry gifts; and
wherein the sixth program instructions are stored on the computer readable medium.

11. The tangible computer readable medium of claim 8, wherein the third program instructions further comprise seventh program instructions for receiving a selection of a male gender specific version of a gender specific baby registry gift and a female gender specific version of the gender specific baby registry gift to form the at least one pair of gender specific baby registry gift; and
wherein the seventh program instructions are stored on the tangible computer readable medium.

12. The tangible computer readable medium of claim 8, further comprising:
eighth program instructions for sending a gift preview to the set of purchasers in response to receiving the purchase selection, wherein the gift preview depicts a male gender specific version of a gift in the at least one of the at least one pair of gender specific baby registry gifts, and wherein the gift preview depicts a female gender specific version of the gift in the at least one of the at least one pair of gender specific baby registry gifts; and wherein the eighth program instructions are stored on the tangible computer readable medium.

13. The tangible computer readable medium of claim 8, further comprising:
    ninth program instructions for sending a welcome packet to the registrant, wherein the welcome packet comprises a consent form;
    tenth program instructions for receiving the consent form from the registrant with a signature of the registrant for authorizing a gender notification entity to provide the gender notification; and
    wherein the ninth program instructions and the tenth program instructions are stored on the tangible computer readable medium.

14. The tangible computer readable medium of claim 8, further comprising:
    eleventh program instructions for delivering a confirmation request to a gender notification entity in response to an absence of the gender notification within a predetermined period of time; and
    wherein the eleventh program instructions are stored on the tangible computer readable medium.

15. An apparatus comprising:
    a bus system;
    a memory connected to the bus system, wherein the memory includes computer usable program code; and
    a processing unit connected to the bus system;
    wherein the computer usable program code includes executable instructions which configure the processing unit to create a baby registry profile for a registrant of a baby registry; in response to determining that the registrant has not specified a gender of a baby associated with the baby registry profile, populate the baby registry profile with at least one pair of gender specific baby registry gifts designated by the registrant, wherein the at least one pair of gender specific baby registry gifts comprises a first product and a second product, wherein the first product is designated for a female baby and the second product is designated for a male baby; receive a purchase selection from a set of purchasers of at least one of the at least one pair of gender specific baby registry gifts designated by the registrant; and responsive to receiving a gender notification specifying the gender of the baby, automatically identify for delivery from the purchase selection only products in the at least one of the at least one pair of gender specific baby registry gifts which correspond to the specified gender of the baby.

16. The apparatus of claim 15, wherein the executable instructions further configure the processing unit to present the registrant with the set of baby registry gifts in a gift selection process, wherein a first step of the gift selection process comprises selection of baby basic registry gifts, and wherein a second step of the gift selection process comprises selection of the at least one pair of gender specific baby registry gifts.

17. The apparatus of claim 15, wherein the executable instructions further configure the processing unit to present a male gender specific version of a gender specific baby registry gift with a female gender specific version of the gender specific baby registry gift to form the at least one pair of gender specific baby registry gifts.

18. The apparatus of claim 15, wherein the executable instructions further configure the processing unit to receive a selection of a male gender specific version of a gender specific baby registry gift and a female gender specific version of the gender specific baby registry gift to form the at least one pair of gender specific baby registry gifts.

19. The apparatus of claim 15, wherein the executable instructions further configure the processing unit to send, in response to receiving the purchase selection, a gift preview to the set of purchasers, wherein the gift preview depicts a male gender specific version of a gift in the at least one of the at least one pair of gender specific baby registry gifts, and wherein the gift preview depicts a female gender specific version of the gift in the at least one of the at least one pair of gender specific baby registry gifts.

20. The apparatus of claim 15, wherein the executable instructions further configure the processing unit to send a welcome packet to the registrant, wherein the welcome packet comprises a consent form; and receive the consent form from the registrant with a signature of the registrant for authorizing a gender notification entity to provide the gender notification.

* * * * *